Figure 1:
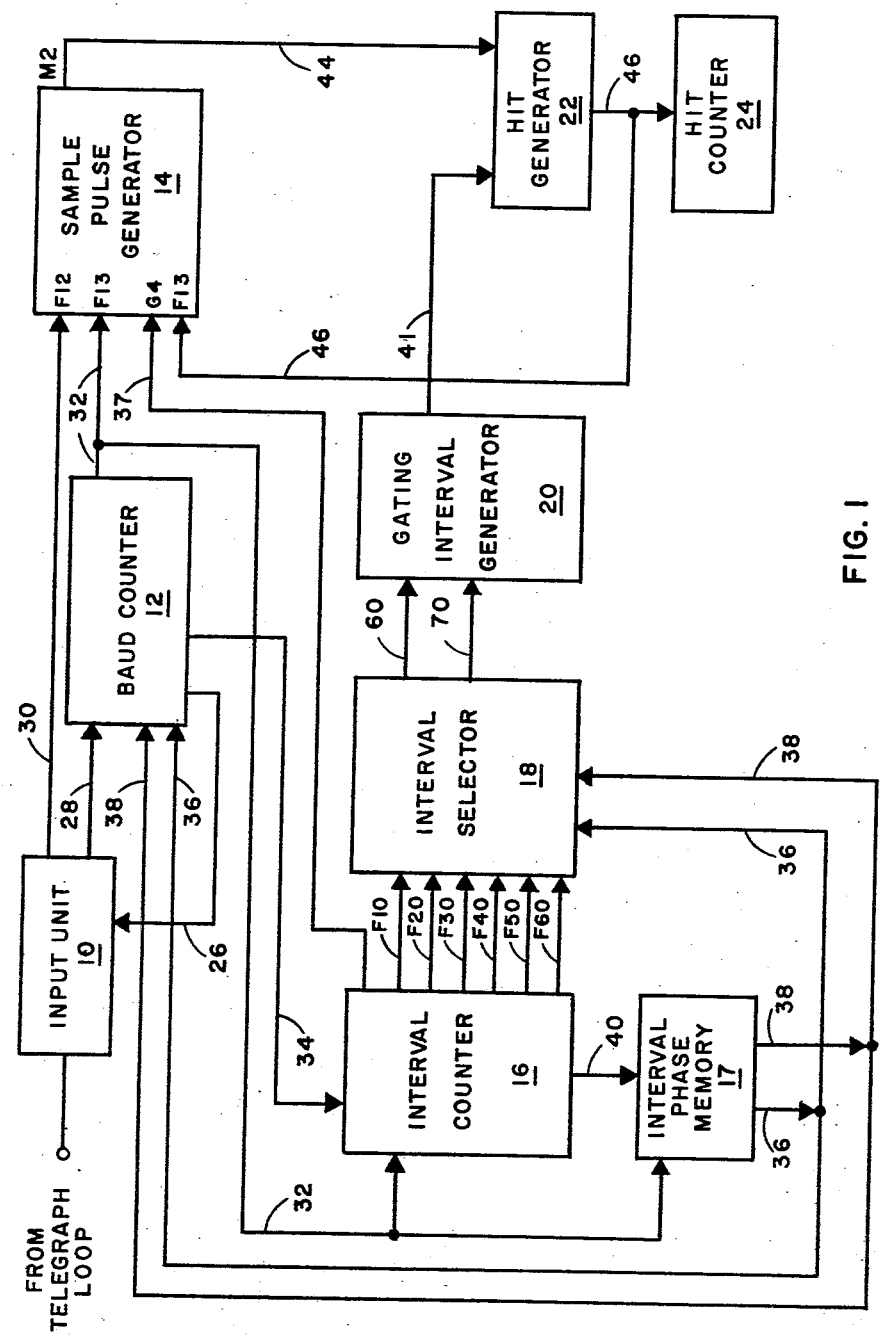

INVENTORS
NORMAN E. PETERSON
AND ERNEST E. COURCHENE, JR.
BY
ATTORNEY

INVENTORS
NORMAN E. PETERSON
AND ERNEST E. COURCHENE, JR.
BY
S.C. Yutip
ATTORNEY April 21, 1964  N. E. PETERSON ETAL  3,130,268
SIGNAL DISTORTION MONITOR
Filed Nov. 25, 1960 3 Sheets-Sheet 3

INVENTORS
NORMAN E. PETERSON
AND ERNEST E. COURCHENE, JR.
BY
ATTORNEY

3,130,268
SIGNAL DISTORTION MONITOR
Norman E. Peterson and Ernest E. Courchene, Jr., Fairfield County, Conn., assignors to Stelma, Inc., Stamford, Conn., a corporation of Connecticut
Filed Nov. 25, 1960, Ser. No. 71,520
3 Claims. (Cl. 178—69)

This invention pertains to signal distortion monitoring and more particularly to the distortion of pulse signals representing coded groups of information.

Coded groups of pulses are used in many fields today such as digital computors, data processing, radar and telegraphy. In telegraphy, telegraph transmitters transmit one or the other of two different values of current via a transmission line, one value being called the marking current and the other the spacing current. The marking current may be a positive current or a high current, while the spacing current can be a low current or negative current. Furthermore, the marking condition can be just the presence of a current and the spacing condition the absence of a current on the line. In any event, a character or other unit of information is represented by a coded group of marking and spacing currents. One of the most common code mark and space codes employed represents each character as a five unit coded combination of marks and spaces of equal time duration called bauds with a start space preceding the five unit coded combination and a stop mark following the combination. When mark and space codes are employed, the information transmitted along a line is represented by a series of ideally rectangular pulses. The leading and trailing edges of these pulses are the transitions from mark to space or space to mark currents. Although ideally the transitions are abrupt, in practice, they become distorted. The distortion occurs because the frequency response of the line tends to introduce both rounding of the pulses as well as attenuation. This distortion is aggravated as the length of the telegraph line increases or as the components in the transmitter age or fail.

Heretofore, many attempts have been employed using signal combining techniques, analog time base measurements and cathode ray tube display techniques to give indications of the distortion of the pulses on the line. However, these techniques have only a limited degree of accuracy. Furthermore, the reliability of such circuits usually decreases with increase in the amount of test equipment.

It is a general object of the invention to provide improved signal monitoring apparatus.

It is another object of the invention to provide improved pulse monitoring apparatus which detects the distortion of pulses above a predetermined limit of distortion.

It is a further object of the invention to provide pulse monitoring equipment wherein the predetermined levels of distortion and their measurement are provided by highly precise and very reliable time base generating apparatus.

It is a more specific object of the invention to provide improved telegraph monitoring equipment which can detect the deterioration of pulses to give an alarm before any serious loss of the information being transmitted occurs.

Briefly, in accordance with one embodiment of the invention, apparatus is provided for measuring the distortion signals. The criterion for the distortion measurement is the difference in the time of duration of the signals from a predetermined time duration. The apparatus comprises means for sensing the start of a signal to be monitored. Means are provided for counting pulses of fixed time duration, which time duration is a given fraction of the predetermined or ideal time duration of the signals being monitored. The counting means are energized by the means for sensing the start of the signal. Means are also provided for initiating a time interval when a first predetermined count is registered in the counting means and for terminating the timing interval when a second predetermined count is registered in the counting means. Means for sensing the end of the monitored signal give an indication when the end of this signal does not occur during the time duration established by the sensing of the first and second predetermined counts registered in the counting means.

Figure 2:
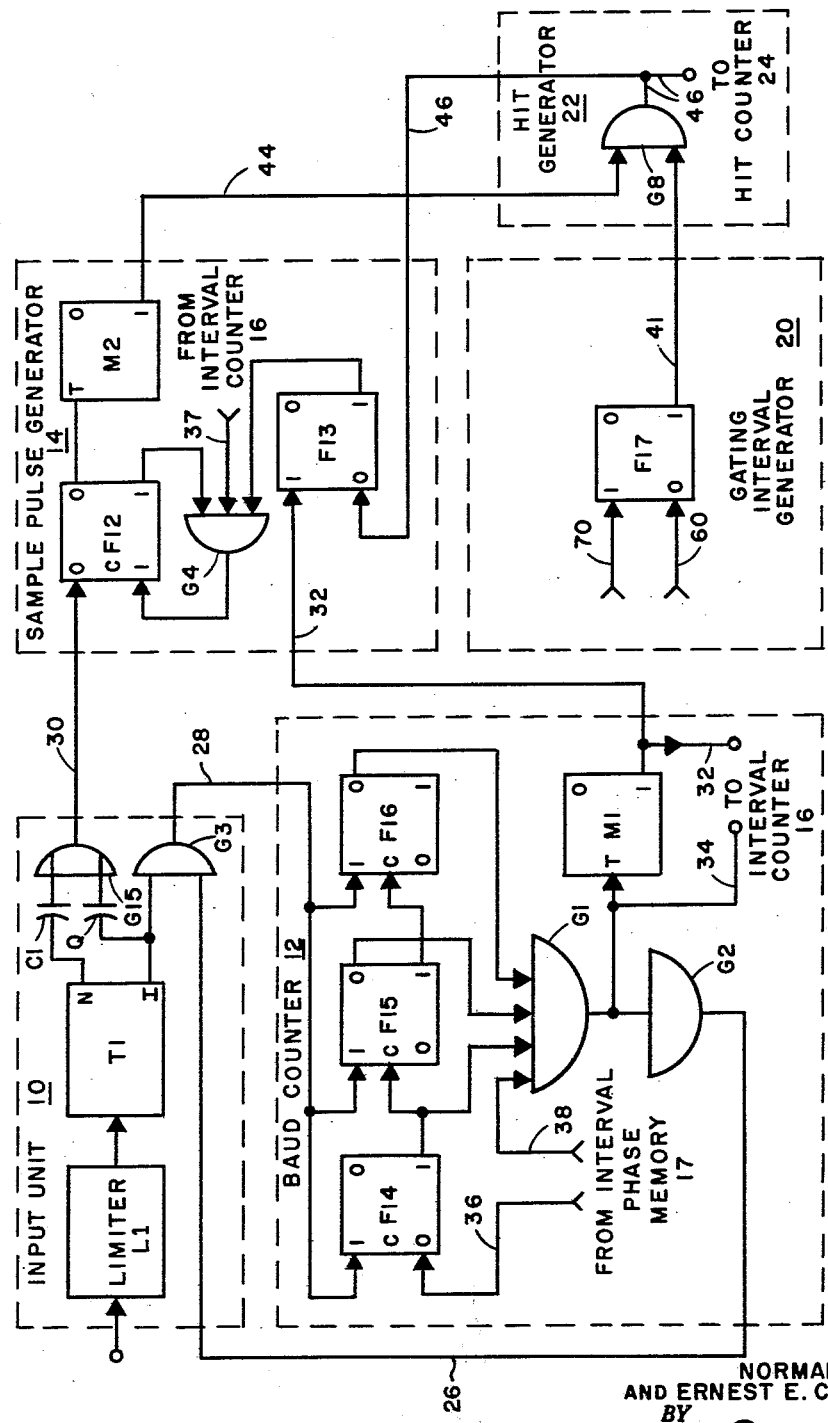
Figure 3:
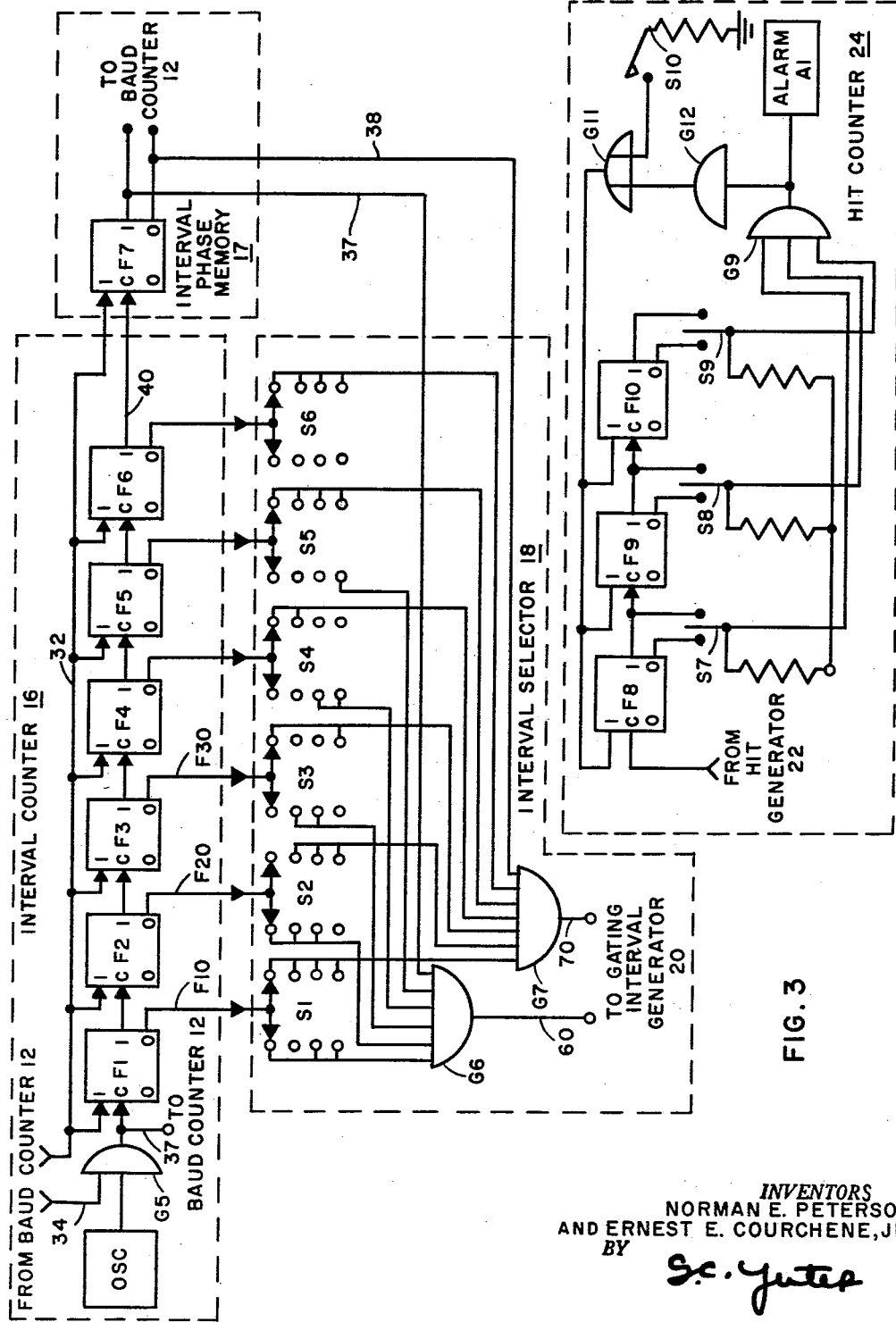

Other objects, features and advantages of the invention will be apparent from the following detailed description when read with the accompanying drawings wherein:

FIGURE 1 shows in block diagram form signal monitoring apparatus in accordance with the invention; and FIGURES 2 and 3 show in logical symbol form the elements of the signal monitoring apparatus of FIGURE 1.

The signal monitoring apparatus will be described, by way of example, as a telegraph monitor. Generally the telegraph monitor senses a stop mark to start space transition at the start of each character for activating a time interval for each baud received. The time interval is established by counting precisely timed pulses with a first count starting the time interval and a second count ending the time interval. If a baud transition occurs during the time interval, the signal is considered undistorted. However, if the baud transition occurs outside the time interval the signal is considered distorted and a hit is registered. Hits are accumulated and if more than a certain number are recorded an alarm is activated. The time interval can be controllably changed by changing the counts required to initiate and terminate the time interval.

Referring to FIG. 1, the telegraph monitor comprises: an input unit 10 which receives the signals representing the telegraph characters and transmits a pulse for each baud transition of a received character and also a pulse at the stop mark to start space transition at the end of a character; a binary baud counter 12 which counts the bauds of each character; a sample pulse generator 14 which generates transition sampling pulses for each of the baud transitions; a binary interval counter 16 which generates and counts two sets of sixty-four precisely timed pulses for each baud interval; an interval phase memory 17 which remembers which of the two sets of precisely timed pulses is being counted; an interval selector 18 which selects certain of the counts of interval counter 16 in accordance with preselected distortion tolerances; a gating interval generator 20 which establishes a time interval during which a baud transition should occur in accordance with the selected distortion tolerances; a hit generator 22 which indicates a hit whenever a baud transition occurs outside the selected time interval; and a hit counter 24 which counts hits and gives an alarm if a predetermined number of hits occur.

More particularly, input unit 10 is initially enabled by a signal on line 26 from baud counter 12 to transmit a pulse only when the stop mark to start space transition occurs. When the stop mark to start space transition occurs, input unit 10 transmits a pulse via line 30 to sample pulse generator 14. The pulse has no effect during this particular transition, i.e., the stop mark to start space transition of the character. At the same time, input unit 10 transmits a pulse via line 28 to baud counter 12 which is stepped off a home or rest position. As baud counter 12 steps off the home position, the enabling signal is removed from line 26 preventing input unit 10 from transmitting any further pulses on line 28 until baud counter 12 has counted six bauds and returns to the home position. Simultaneously baud counter 12 transmits a signal via line 32 for priming sample pulse generator 14 to generate a sampling pulse for each baud transition pulse received from line 30. The pulse on line 32 is also received by interval counter 16 to preset the binary counter therein to a count of sixty-three. Baud counter 12 also transmits an enabling signal via line 34 which starts interval counter 16 counting the precisely timed pulses. The first precisely timed pulse counted by interval counter 16 causes the counter to be set to a count of zero. When interval counter 16 passes through the transition of the count of sixty-three to the count of zero, a pulse is transmitted via line 40 to set interval phase memory to the late count phase. That is, interval counter 16 will first count sixty-four pulses which occur during the half of a baud time after a baud transition should occur. When interval phase memory 17 is set to the late phase a high voltage is transmitted on line 36 to interval selector 18 to alert it for signals from interval counter 16 related to late phase counts and to baud counter 12 where it steps baud counter 12 one unit. Simultaneously, interval phase memory 17 transmits a low voltage via line 38 to interval selector 18 to inhibit or desensitize this unit to signals received from interval counter 16 which may represent an undesired early phase count at this time, and to baud counter 12 where it has no effect at this time.

When interval counter 16 has counted from zero to sixty-three and then recycles to zero it transmits another signal via line 40 to interval phase memory 17. It should be noted that this is at the end of the first count of sixty-four precisely timed pulses by interval counter 16 and it occurs precisely one-half a baud time after the stop mark to start space transition or one-half a baud time before the possible baud transition of the first baud should occur if that baud transition has no distortion. The signal received by interval phase memory 17 causes this unit to switch to the early count phase state, that is, indicating that the interval counter 16 is now beginning to count the sixty-four timed pulses which occur in the half-baud time before a baud transition may occur. The levels of the voltages on lines 36 and 38 interchange and, in particular, interval selector 18 is enabled to sense only phase counts and is desensitized or inhibited from sensing late phase counts. Interval counter 16 counts sixty-four precisely timed pulses for a second time. At the end of this second (even) count a signal on line 40 causes interval phase memory 17 to switch to another late count phase. Baud counter 12 is again stepped. During this late count phase, interval counter 16 counts the sixty-four pulses encompassing the half-baud time starting from the possible baud transition associated with the first baud of a character. At the end of the third count, an odd count, interval counter 16 transmits another signal on line 40 causing interval counter 17 to switch to another early count phase and in particular the early count phase associated with the second baud of a character. In this manner, the time intervals are generated. A signal on line 40 at the end of each odd phase count by interval counter 16 switches interval memory 17 to the early count phase enabling or sensitizing interval selector 18 to early phase counts. A signal on line 40 at the end of each even count switches interval phase memory 17 to the late count phase which enables or sensitizes interval selector 18 to late phase counts.

The start of each late count phase also causes baud counter 12 to step to the next succeeding baud count of the character. When baud counter 12 reaches the count of six, that is, the time when the stop mark at the end of a character should occur, it has returned to the home position and the system locks up awaiting the stop mark to start space transition associated with the next incoming character.

The timing interval function associated with distortion detection will now be described. It will be recalled that interval counter 16 counts one hundred and twenty-eight precisely timed pulses for each baud. Sixty-four precisely timed pulses are counted before the possible baud transition and sixty-four after the possible baud transition. Interval counter 16 counts from a preset count of effectively zero to a count of sixty-three and recycles, the zero count occurring at the ideal baud transition time. Assume that a five percent error is being monitored. Such an error is slightly greater than three precisely timed pulse periods out of sixty-four precisely timed pulse periods. Therefore, as interval counter 16 counts from zero to sixty-three during the early phase count, if a baud transition occurs before the count of sixty-one is registered, the baud transition is greater than five percent early. When the count reaches sixty-three, the late phase count commences and if the baud transition occurs after the count of three is reached during this late phase the error is also greater than five percent. In this manner predetermined counts of the interval counter 16 during the early phase count and late phase counts may be selected to determine the percentage of distortion.

The operation of the system in the performance of this function will now be described. As interval counter 16 counts the timed pulses, it transmits via lines F10, F20, F30, F40, F50 and F60 to interval selector 18 coded combinations of signals representing the count. Interval selector 18 is a switching means which permits the selection of different coded combinations of these signals which represent different counts associated with different percentages of distortion. In the example cited, interval selector 18 will select the coded combination of signals representing the numbers sixty-one, and three. During the early count phase a first coincidence gate in interval selector 18 is alerted and during the late count phase a second coincidence gate in interval selector 18 is alerted by signals on lines 36 and 38 from interval phase memory 17 as previously described. Therefore, when the count of sixty-one is reached by interval counter 16 a signal from the first coincidence gate is transmitted via line 70 to gating interval generator 20, causing it to pass an inhibiting signal via line 41 to hit generator 22. Up to this time hit generator 22 was receiving an enabling signal from line 41. When the interval counter 16 reaches the count of three during the late count phase, a signal on line 60 is fed to gating interval generator 20, causing the signal on line 40 to change from inhibiting to enabling and it remains so until interval counter 16 again reaches the count of sixty-one during the next early phase count.

Hit generator 22 receives transition sampling pulses via line 44 from sample pulse generator 14 each time a baud transition actually occurs. If a transition sampling pulse is received when hit generator 22 is receiving an inhibiting signal on line 41 nothing happens since the baud transition occurred within the selected error tolerance. If a transition sampling pulse is transmitted from sample pulse generator 14 when the enabling signal is present on line 41 there is greater than the permissible distortion in the baud transition and hit generator 22 transmits a pulse via line 46 to hit counter 24 and sampling pulse generator 14. The pulse is registered in hit counter 24 and if more than a predetermined number of hits are registered within a message or a predetermined period of time a signal is generated. The pulse on line 41 is also transmitted to sample pulse generator 14 to prevent the generation of any more transition sampling pulses during the particular character in which a hit was generated so that only one hit may be registered per character. The several units of FIGURE 1 will now be described in detail.

Referring to FIG. 2, input unit 10 is shown comprising limiter L1 which is a conventional diode limiter that clips the input signals to a standard level; a Schmitt trigger T1 of conventional design, a diode OR gate G15 which has the property of transmitting a high voltage when a high voltage is present at either one of its input terminals; and an inverting AND gate G3 which has the property of transmitting a low voltage from its output terminal whenever high voltages are present at all its input terminals. At other times, the inverting AND gate which is representative of all inverting AND gates throughout the system, transmits a high voltage when either one of its input terminals is not at a high voltage. By high voltage is meant the higher of two voltages. Throughout the system the high voltage will be ground potential. A low voltage is a voltage below ground potential and throughout the system this low voltage is assumed to be —15 volts. The input unit 10 operates in the following manner. The mark and space signals representing the bauds of the characters are shaped by limiter L1 and trigger T1. The N or normal output terminal of trigger T1 transmits an exact replica of the input bauds whereas the output terminal I of trigger T1 transmits the inverse of the bauds. Diode OR gate G15 has its input terminals coupled to both the normal N and inverted I output terminals of trigger T1. Therefore, diode OR gate G15 by virtue of differentiating capacitors C1 and C2 transmits a positive pulse via line 30 whenever a mark to space or space to mark transition is received by input unit 10. The first input terminal of inverting AND gate G3 is coupled to the inverted output terminal of trigger T1 and its second input terminal is coupled via line 26 to baud counter 12. When baud counter 12 is in its home position, that is, when the stop mark from the previous character has been counted, the voltage on line 26 is high, while the stop mark is being received by input unit 10 the inverted output terminal I of trigger T1 is at a high potential. Therefore, the output of inverting AND gate G3 is at a negative potential. However, when the stop mark to stop space transition occurs, the output of inverting AND gate G3 goes to a high potential, causing a positive going voltage excursion to be transmitted via line 28 to baud counter 12. This positive going excursion causes baud counter 12 to step off the home position and the voltage on line 26 to go to a low value. Inverting AND gate G3 is blocked and will not be opened or enabled until baud counter 12 returns to its home point. Baud counter 12 comprises the bistables F14, F15 and F16; the inverting AND gates G1 and G2 and the monostable multivibrator M1. A typical bistable F14 has a "one," a C and a "zero" input terminal and a "zero" and a "one" output terminal. Whenever a positive going voltage excursion is received at the "one" input terminal, the bistable F14 is triggered in its "one" state, causing a high voltage to be transmitted from its "zero" output terminal and a low voltage to be transmitted from its "one" output terminal. Whenever a positive voltage is received at is "zero" input terminal, the bistable F14 goes into its "zero" state, causing a low voltage to be transmitted from its "zero" output terminal and a high voltage to be transmitted from its "one" output terminal. Whenever a positive going voltage transition is received at the C input terminal, the bistable F14 changes state. That is, if it were in its "one" state, it flips to its "zero" state and vice versa. The bistables F14, 15 and 16 are cascaded to form a three stage binary counter with the "one" output terminal of the bistable F14 coupled to the C input terminal of the bistable F15 and the "one" output terminal of the bistable 15 coupled to the C input of the bistable F16. When the baud counter 12 received the positive going voltage excursion from the line 28 at the stop mark to start space transition of the character, the bistables F14, 15 and 16 whose "one" input terminals are coupled to the line 28 are all switched to their "one" stable state. The baud counter 12 is effectively counting the baud zero. The input terminal of the inverting AND gate G1 that is coupled to the "one" output terminal of bistable F14 is at a low voltage and therefore the output of inverting AND gate G1 is at a high voltage. Just prior to the setting of the baud counter 12 to the zero count, the output of inverting AND gate G1 had been at a low voltage. This transition from a low voltage to a high voltage causes the transmission of a positive going voltage to the T input of monostable multivibrator M1. In response to this positive going transient, the monostable multivibrator M1 transmits a thirty microsecond high voltage pulse on the line 32. At the same time, the high voltage at the output of inverting AND gate G1 is transmitted via line 34 to activate interval counter 16. The high voltage from the output of inverting AND gate G1 is inverted by inverting AND gate G2 and transmitted via line 26 to inhibit input unit 10 until baud counter 12 again reaches its home position. After a sixth pulse is received via line 36 from interval phase memory 17 indicating that the stop mark associated with the character should be received, the bistables F14 to 16 are registering a count of six. During the early phase count the voltage on line 38 from the interval phase memory 17 goes high and the inverting AND gate G1 is now receiving high voltages at its four input terminals and therefore transmits a low voltage which is inverted by inverting AND gate G2, causing a high voltage to be present on line 26. In this manner, baud counter 12 controls the sensing of stop mark to start space transitions by input unit 10.

Sample pulse generator 14 includes: bistables F12 and F13; inverting AND gate G4; and monostable multivibrator M2. When baud counter 12 stepped off the home position a positive going voltage transition on line 32 sets bistable F13 to the "one" state causing a high voltage to be transmitted from its "one" output terminal to a first input terminal of inverting AND gate G4. Whenever a positive going voltage pulse is received from input unit 10 via line 30 bistable F12 is set to the "zero" state with its "one" output terminal transmitting a high voltage to a second input of inverting AND gate G4. The third input of inverting AND gate G4 is coupled via line 37 to the interval counter 16 which transmits on this line the pulses being counted. The voltage on line 37 is low and will be low whenever the binary counters in the interval counter 16 have settled after counting a pulse, that is the interval between any two pulses. At such time the output terminal of inverting AND gate G4 transmits a positive going pulse which sets bistable F12 to the "one" state. Consequently, a positive going voltage transition is transmitted from the "zero" output terminal of bistable F12 to the input terminal T of monostable multivibrator 14, which accordingly transmits from its "one" output terminal a high voltage pulse via line 44 to hit generator 22. This high voltage pulse is the transition sampling pulse which occurs in this manner for each baud transition received by input unit 10. However, to insure that only one hit is registered per character, the "zero" input terminal of bistable F13 is coupled via line 46 to hit generator 22. If a hit is scored during a character, a positive going voltage transient (the trailing edge of a low voltage pulse) is fed from hit generator 22 via line 46 to the "zero" input terminal of bistable F13 which sets to the "zero" state. The "one" output terminal of bistable F13 transmits a low voltage which blocks inverting AND gate G4. Consequently, bistable F12 cannot be set to the "one" state and since the transition from the "zero" to the "one" state is required to trigger monostable M2, no transition sampling pulses can be generated for the remainder of the character. However, at the stop mark to start space transition of the next character bistable F13 is again set to the one state and inverting AND gate G4 is reenabled.

Referring now to FIG. 3, interval counter 16 is shown comprising: Oscillator OSC, a conventional crystal controlled pulse generator having a pulse repetition rate 128 times that of the bauds; inverting AND gate G5; and bistables F1 to F6 coupled in cascade to form a six-stage binary counter. Oscillator OSC is continuously running and transmitting precisely timed pulses to one input terminal of inverting AND gate G5. The other input terminal of inverting AND gate G5 is coupled via line 34 to baud counter 12. As long as baud counter 12 is on the home position a low voltage is present on line 34. However when baud counter 12 steps off the home position the voltage on the line 34 goes high and pulses pass through inverting AND gate G5. Just prior to the transmission of the first pulse by inverting AND gate G5 to the count input terminal of bistable F1, the voltage on line 32 from baud counter 12 changes from low to high and all the bistables F1 through F6 set to the "one" state. The receipt of the first pulse from inverting AND gate G5 sets the bistables F1 to F6 to the "zero" state or interval counter 16 contains a count of zero. As each pulse is received from Oscillator OSC the bistables F1 to F6 binary count one pulse at a time. The "zero" output terminals of the bistables F1 to F6 are respectively coupled to the lines F10 to F60. The voltages of these lines will switch between high and low values in a binary manner with a unique combination for each count from zero to sixty-three. The receipt of the sixty-fourth pulse causes all the bistables F1 to F6 to assume the "one" state. The next received pulse sets all the bistables F1 to F6 to the "zero" state and a new counting cycle begins.

Each time the bistable F6 changes from the "one" state to the "zero" state a positive going voltage transition is transmitted via line 40 to interval memory 17.

Interval memory 17 comprises bistable F7 which is initially set to the "one" state by a positive going voltage transition generated by baud counter 12 via line 32 when baud counter 12 steps off the home position. When the first pulse is transmitted by inverting AND gate G5 all the bistables F1 to F6 switch to the "zero" state. Bistable F7, therefore, also switches to the "zero" state indicating that a late count phase is in progress. The next positive going voltage transition on line 40 from bistable F6 switches bistable F7 to "one" state indicating that an early count phase is starting. In this manner interval phase memory 17 indicates whether interval counter 16 is performing an early phase count or a late phase count.

Interval selector 18 is essentially composed of six ganged switches S1 to S6 and inverting AND gates G6 and G7. Switch S1 which is typical comprises a moving contact coupled to line F10, a left bank of fixed contacts coupled to one input terminal of inverting AND gate G6, and a right bank of fixed contacts coupled to one input of inverting AND gate G7. When the switches S1 to S6 are in the top position as shown in FIG. 3, the only input terminals of inverting AND gate G6 which will not be at low voltages are present on the lines F10 and F20. This situation occurs when interval counter 16 contains a count of three. Similarly, all input terminals of inverting AND gate G7 coupled to switches S1 to S6 will not be at low voltages when high voltages are present on lines F10, F30, F40, F50, and F60 when interval counter 16 is registering a count of sixty-one. Inverting AND gate G7 is enabled during an early phase count by a high voltage on line 38. Inverting AND gate G6 is enabled during a late count phase by a high voltage on line 36. During an early phase count G7 transmits a negative going voltage transition via line 70 to gating interval generator 20 when interval counter 16 completes a count of sixty-one or three pulse times before an ideal baud transition. Inverting AND gate G6 transmits a negative going transition on line 60 when interval counter 16 has recycled and completes a count of three. Therefore the voltage transition from inverting AND gate G7 starts a time interval and the voltage transition from AND gate G6 terminates a time interval six pulse times in duration centered about an ideal baud transition. This time interval is six one hundred and twenty-eighths of a baud interval or slightly less than five percent of the baud interval. The remaining positions of switches S1 to S6 are wired to establish other time intervals.

Returning to FIG. 2, gating interval generator 20 is bistable F17 having its "one" input terminal coupled to line 70, its "zero" input terminal coupled to line 60 and its "one" output terminal coupled to line 41. Bistable F17 is different from the remaining bistables in the system in that it is triggered by negative going voltage transitions. In particular when a negative going voltage transition is received from line 70 during an early count phase, a low voltage is transmitted on line 41 which remains until a negative going transition is received from line 60.

At this time the voltage on line 41 goes high. In other words, the voltage on line 41 is high at all times except during the time intervals selected by interval selector 18.

Line 41 is coupled to hit generator 22 which is inverting AND gate G8, whose other input terminal receives a high going transition sampling pulse via line 44 from sample pulse generator 12 at each baud transition. During the selected time interval the voltage on line 41 is low, blocking inverting AND gate G8. However, outside the time interval the voltage on line 41 is high so that if a sampling pulse occurs at this time, inverting AND gate G8 transmits a pulse to line 46 indicating a hit. A hit pulse is transmitted to sample pulse generator 14 to disable it for the remainder of the character and to hit counter 24 (FIG. 3). It should be noted that when a hit is scored inverting AND gate G8 transmits a negative going voltage pulse. However, the trailing edge of this pulse is a positive going transient which is effective in sample pulse generator 14 and hit counter 24.

Hit counter 24 comprises: bistables F8, F9 and F10 coupled as a binary counter; the switches S7, S8 and S9; inverting AND gates G9 and G12; diode OR gate G11; and alarm A1. As hit pulse are received from hit generator 22 via line 46 they are fed to the count input terminal C of bistable F8. The bistables F8, 9 and 10 start counting the hits. If, for example, an alarm is desired when six hits are registered during a predetermined time interval switches S7, S8 and S9 are positioned in the following manner: the moving contact of switch S7 is positioned to the "zero" output terminal of bistable F8; the moving contact of switch S8 is positioned to the "zero" output terminal of bistable F9; and the moving contact of switch S9 is positioned to the "one" output terminal of flip-flop of bistable F10. The moving contacts of switches S7, S8 and S9 are coupled to input terminals of inverting AND gate G9. Thus when a count of six is accumulated in the bistables F8, F9 and F10 a low voltage is present on the output terminal of inverting AND gate G9. This low voltage is transmitted to alarm A1. The low voltage is also inverted by inverting AND gate G12 and fed to one input terminal of diode OR gate G11. Therefore diode OR gate G11, at this time transmits a high voltage to the "one" input terminals of bistables F8, F9 and F10 to clear them to the "zero" state. Switch S10 which is coupled to the other input terminal of diode of gate G11 is a switch which may be periodically closed at fixed time intervals to clear the hit counter 24 so that the hit counter will generate an alarm only if the six hits are scored within the predetermined time interval. It should be understood that switch S10 can take many mechanical or electronic forms and is only shown as an idealized embodiment.

Thus there has been shown an improved pulse distortion analyzer which by employing pulse counting techniques can provide a very reliable and precise means for detecting distortion in information pulses such as may be encountered in telegraphy.

While only one embodiment of the invention has been shown and described in detail, there will now be obvious to those skilled in the art many modifications and variations accomplishing many or all of the objects and to which accrue the advantages but which do not depart from the spirit of the invention as defined in the appended claims.

What is claimed is:

1. Apparatus for measuring the distortion of bauds in telegraph characters represented by a start space, a stop mark and a plurality of coded combination of baud marks and spaces, the distortion measurement criterion being the deviation in the time duration of the bauds from a predetermined time duration, said apparatus comprising sensing means for sensing a stop mark to start space transition at the start of each telegraph character, baud counter means for controlling said sensing means, interval counting means for counting timing pulses $2n$ of said timing pulses occurring during each predetermined time duration, said interval counting means counting one group of $n$ of said timing pulses and recycling to count another group of $n$ timing pulses for each of said bauds, said interval counting means under the control of said baud counter means to starting counting said timing pulses after said sensing means senses the stop mark to start space transition, said interval counting means causing said baud counter means to accumulate a unit count each time said interval counting means completes the count of two of said groups, an interval phase memory means having first and second states for remembering whether said interval counting means is counting one of said one groups or one of said other groups, said interval phase memory means responsive to said interval counting means for changing state whenever said interval counting means starts counting a group, interval selector means responsive to said interval counting means and said interval phase memory means for generating a first signal when said interval counting means registers a first predetermined count and said interval phase memory means is in a first state and for generating a second signal when said interval counting means registers a second count and said interval phase memory means is in a second state, a time interval generator means which starts generating a time interval signal upon receipt of said first signal and stops generating said time interval signal upon receipt of said second signal, sample pulse generating means for generating a sampling pulse for each transition between baud marks and spaces means responsive to said sampling pulse and said time interval signal for transmitting a hit signal whenever said sampling pulse occurs during the absence of said time interval signal and means for counting said hit signals to give an alarm if more than a predetermined number of said hit signals are generated during a given period of time.

2. Apparatus for measuring the distortion of bauds in telegraph characters represented by a start space, a stop mark and a plurality of coded combination of baud marks and spaces, the distortion measurement criterion being the deviation in the time duration of the bauds from a predetermined time duration, said apparatus comprising sensing means for sensing a stop mark to start space transition at the start of each telegraph character, baud counter means for controlling said sensing means, timing pulses generating means for generating timing pulses, $2n$ of said timing pulses occurring during each predetermined time duration, interval counting means for counting one group of $n$ of said timing pulses and recycling to count another group of $n$ timing pulses for each of said bauds, gating means under the control of said baud counter means for coupling said timing pulse generating means to said interval counting means after said sensing means senses the stop mark to start space transition, said interval counting means causing said baud counter means to accumulate a unit count each time said interval counting means completes the count of two said groups, an interval phase memory means having first and second states for remembering whether said interval counting means is counting one of said one groups or one of said other groups, said interval phase memory responsive to said interval counting means for changing state whenever said interval counting means starts counting a group, interval selector means responsive to said interval counting means and said interval phase memory means for generating a first signal when said interval counting means registers a first predetermined count and said interval phase memory means is in a first state and for generating a second signal when said interval counting means registers a second count and said interval phase memory means is in a second state, a time interval generator which starts generating a time interval signal upon receipt of said first signal and stops generating said time interval signal upon receipt of said second signal, sample pulse generating means for generating a sampling pulse for each transition between baud marks and spaces means responsive to said sampling pulse and said time interval signal for transmitting a hit signal whenever said sampling pulse occurs during the absence of said time interval signal and means for counting said hit signals to give an alarm if more than a predetermined number of said hit signals are generated during a given period of time.

3. Apparatus for measuring the distortion of bauds in telegraph characters represented by a start space, a stop mark and a plurality of coded combination of baud marks and spaces, the distortion measurement criterion being the deviation in the time of occurrence of transitions between baud mark and spaces from predetermined times, said apparatus comprising sensing means for sensing a mark to space transition, baud counter means for controlling said sensing means to sense the mark to space transition at the start of a telegraph character timing pulse generating means for generating timing pulses $2n$ of said timing pulses occurring during each predetermined time duration, interval counting means for counting one group of $n$ of said timing pulses and recycling to count another group of $n$ timing pulses for each of said bauds, gating means under the control of said baud counter means for coupling said timing pulse generating means to said interval counting means after said first sensing means senses the stop mark to start space transition, said interval counting means causing said baud counter means to accumulate a unit count each time said interval counting completes the count of one of said one groups, an interval phase memory means having first and second states for remembering whether said interval counting means is counting one of said one groups or one of said other groups, said interval phase memory means responsive to said interval counting means for changing states whenever said interval counting means starts counting a group, interval selector means responsive to said interval counting means and said interval phase memory means for generating a first signal when said interval counting means registers a first predetermined count and said interval phase when said interval counting means registers a second count and said interval phase memory means is in a second state, a timing interval generator which starts generating a timing interval signal upon receipt of said first signal and stops generating said timing interval signal upon receipt of said second signal, sample pulse generating means for generating a sampling pulse for each transition, between baud marks and spaces means responsive to said sampling pulse and said timing interval signal for transmitting a hit signal whenever said sampling pulse occurs during the absence of said timing interval signal, and means for counting said hit signals to give an alarm if more than a predetermined number of said hit signals are generated during a given period of time.

References Cited in the file of this patent

UNITED STATES PATENTS

| | | |
|---|---|---|
| 2,856,457 | Prior et al. | Oct. 14, 1958 |
| 2,938,077 | Holland et al. | May 24, 1960 |